United States Patent [19]

Munir et al.

[11] Patent Number: 5,314,656
[45] Date of Patent: May 24, 1994

[54] SYNTHESIS OF TRANSITION METAL CARBONITRIDES

[75] Inventors: Zuhair A. R. Munir; Maryam Eslamloo-Grami, both of Davis, Calif.

[73] Assignee: The Regents of the University of California, Oakland, Calif.

[21] Appl. No.: 979,025

[22] Filed: Nov. 20, 1992

[51] Int. Cl.$^5$ .............................................. B22F 1/00
[52] U.S. Cl. ....................................... 419/13; 419/32; 419/38; 419/45; 419/46; 419/57; 75/230
[58] Field of Search ....................... 419/13, 14, 15, 17, 419/30, 32, 38, 39, 42, 45, 46, 56, 57, 61, 66, 68; 75/230, 245

[56] References Cited

U.S. PATENT DOCUMENTS

| | | | |
|---|---|---|---|
| 4,049,876 | 9/1977 | Yamamoto et al. | 428/932 |
| 4,300,952 | 11/1981 | Ingelström et al. | 75/238 |
| 4,906,295 | 3/1990 | Miyamoto et al. | 75/239 |
| 4,965,044 | 10/1990 | Miyamoto et al. | 419/12 |
| 5,137,565 | 8/1992 | Thelin et al. | 75/238 |

OTHER PUBLICATIONS

Deevi, S. and Munir, Z., "The Mechanism of Synthesis of Titanium Nitride by Self-Sustaining Reactions", *J. Mater. Res.*, vol. 5, No. 10, Oct., 1990, pp. 2177–2183.
Munir, Z. et al., "The Synthesis of Titanium Nitride by a Self-Sustaining Combustion Method", *High Temperatures-High Pressures*, vol. 20, (1988) pp. 19–24.
Holt, J. and Munir, Z., "Combustion Synthesis of Titanium Carbide: Theory and Experiment", *J. Matl. Science*, 21:251–259 (1986).
Kirdyashikin, A. et al., "Titanium–Carbon Interaction Mechanism in a Combustion Wave", translated from Fizika Goreniya i Vzryva, vol. 17, No. 4, pp. 33–36, Jul.-Aug., 1981, pp. 377–379.
Yamada, Osamu, "High-Pressure Self-Combustion Sintering of Titanium Carbide", *J. Am. Ceram. Soc.*, 70(9):C-206–C-208 Sep., 1987.
Kharatyan, S. et al., "Ignition of Titanium in Nitrogen", translated from Fizika Goreniya i Vzryva, vol. 11, pp. 26–33, Jan.-Feb., 1975.
Eslamloo-Grami, M. and Munir, Z., "Effect of Porosity on the Combustion Synthesis of Titanium Nitride", *J. Am. Ceram. Soc.*, 73(5):1235–39 (1990).
Eslamloo-Grami, M. and Munir, Z., "Effect of Nitrogen Pressure and Diluent Content on the Combustion Synthesis of Titanium Nitride", *J. Am. Ceram. Soc.*, 73(8):2222–27 (1990).
Avakian, A. et al., "Synthesis of Carbonitrides of Transition Metals", *Combustion Processes in Chemical Technology and Metallurgy*, Chernogolovka, 1975, pp. 1–42.
Merzhanov, A. G. et al., "Self-Propogating High Temperature Synthesis of Inorganic Compounds", *Doklady Akazdem, Nauk SSSR*, vol. 204, No. 2, pp. 429–432, May, 1972.

*Primary Examiner*—Donald P. Walsh
*Assistant Examiner*—Chrisman D. Carroll
*Attorney, Agent, or Firm*—Robbins, Berliner & Carson

[57] ABSTRACT

Transition metal carbonitrides (in particular, titanium carbonitride, $TiC_{0.5}N_{0.5}$) are synthesized by a self-propagating reaction between the metal (e.g., titanium) and carbon in a nitrogen atmosphere. Complete conversion to the carbonitride phase is achieved with the addition of TiN as diluent and with a nitrogen pressure $\geq 0.6$ MPa. Thermodynamic phase-stability calculations and experimental characterizations of quenched samples provided revealed that the mechanism of formation of the carbonitride is a two-step process. The first step involves the formation of the nonstoichiometric carbide, $TiC_{0.5}$, and is followed by the formation of the product by the incorporation of nitrogen in the defect-structure carbide.

6 Claims, 5 Drawing Sheets

SYNTHESIS OF TRANSITION METAL CARBONITRIDES

BACKGROUND OF THE INVENTION

The present invention relates to methods for direct synthesis of transition metal carbonitrides, in particular titanium carbonitride.

Transition metal carbides, nitrides, and carbonitrides are of practical interest because of their hardness, corrosion resistance, and thermal stability. Furthermore, cermets of titanium carbide/nickel and titanium carbonitride/nickel are considered excellent substitutes for tungsten carbide/cobalt cermets; nickel is more abundant and less expensive than cobalt.

Three approaches have heretofore been employed to produce TiC, TiN, and titanium carbonitride ($TiC_xN_y$). One route calls for direct chemical reduction of titanium oxide, titanium chloride, and titanium hydride by carbon, nitrogen, and ammonia, or by carbon and nitrogen to form TiC, TiN and $TiC_xN_y$. Another approach involves solid state diffusion of C, N or both into Ti powders at high temperatures (1000°–1500° C.) in a reaction taking place over the course of several hours, or by sintering a mixture of TiC and TiN. These approaches generally involve three steps: formation of the carbide and nitride phases separately, followed by a homogenizing process in which these two phases are reacted at high temperature.

A third known route is self-propagating high-temperature synthesis (SHS) or combustion synthesis which has been used for TiC [J. B. Holt and Z. A. Munir, "Combustion Synthesis of Titanium Carbide: Theory and Experiment, " *J. Mater. Sci.*, 21(1), 251–9 (1986); A. G. Merzhanov and I. P. Borovinskaya, "Self-Propagating High Temperature Synthesis of Refractory Inorganic Compounds," Dokl. Akad. Nauk. SSSR (Chem.), 204, 429–32 (1972); A. I. Kirdyashkin, Yu. M. Maksimov, and E. A. Nekrasov, "Titanium-Carbon Interaction Mechanism in a Combustion Wave," Fizika Goreniya i Vzryva (Translation), 17(4), 33–6 (1981); O. Yamada, Y. Miyamoto, and M. Koizumi, "High Pressure Self-Combustion Sintering of Titanium Carbide," J. Am. Ceram. Soc., 70(9), C206–8 (1987)], TiN [S. L. Kharatyan, Y. S. Grigorev, and A. G. Merzhanov, "Ignition of Titanium in Nitrogen," Comb. Explo. Shock Waves, 11, 21–6 (1975); Z. A. Munir, S. Deevi, and M. Eslamloo-Grami, "The Synthesis of Titanium Nitride by Self-Sustaining Combustion Method," High Temperatures-High Pressures, 20, 19–24 (1988); M. Eslamloo-Grami and Z. A. Munir, "Effect of Porosity on the Combustion Synthesis of Titanium Nitride," J. Am. Ceram. Soc., 73(5), 1235–9 (1990); M. Eslamloo-Grami and Z. A. Munir, "Effect of Nitrogen Pressure and Diluent Content on the Combustion Synthesis of Titanium Nitride, " J. Am. Ceram. Soc., 73(8), 2222–7 (1990); S. Deevi and Z. A. Munir, "The Mechanism of Synthesis of Titanium Nitride by Self-Sustaining Reactions", *J. Mater. Res.*, 5(10), 2177–83 (1990)], and TiCN [A. B. Avakian et al., "Synthesis of Carbonitrides of Transition Metals," in Combustion Process in Chemical Technology and Metallurgy, Chernogolovka, 1975]. In the SHS process, the highly exothermic heat of reaction propagates in the form of a combustion wave through the reactants, converting them into product phases. While production of TiC and TiN by the SHS method has already been studied extensively, research on $TiC_xN_y$ by this method has been limited. The primary focus in the reported study of combustion synthesis of $TiC_xN_y$ [Avakian et al., supra] was on the use of liquid nitrogen as a reactant.

It is an object of the present invention to provide improved methods for the synthesis of transition metal carbonitrides.

SUMMARY OF THE INVENTION

In accordance with the present invention, transition metal carbonitrides (for example, titanium carbonitride, $TiC_{0.5}N_{0.5}$) are prepared in a single step using a combustion synthesis approach. This is accomplished by a self-propagating reaction between titanium and carbon in a nitrogen atmosphere. With appropriate amounts of transition metal, carbon, and optionally a diluent which serves as a source of transition metal, a homogeneous phase of the carbonitride is prepared by initiating a self-propagating wave in an atmosphere of nitrogen gas. The process is energy efficient in comparison to the conventional processes. As an example, complete conversion of titanium to the carbonitride is achieved using TiN as a diluent and a nitrogen atmosphere of $\geq 0.6$ MPa.

BRIEF DESCRIPTION OF THE DRAWINGS

The invention may be better understood with reference to the accompanying drawings, wherein.

DETAILED DESCRIPTION OF THE INVENTION

Figure 1:
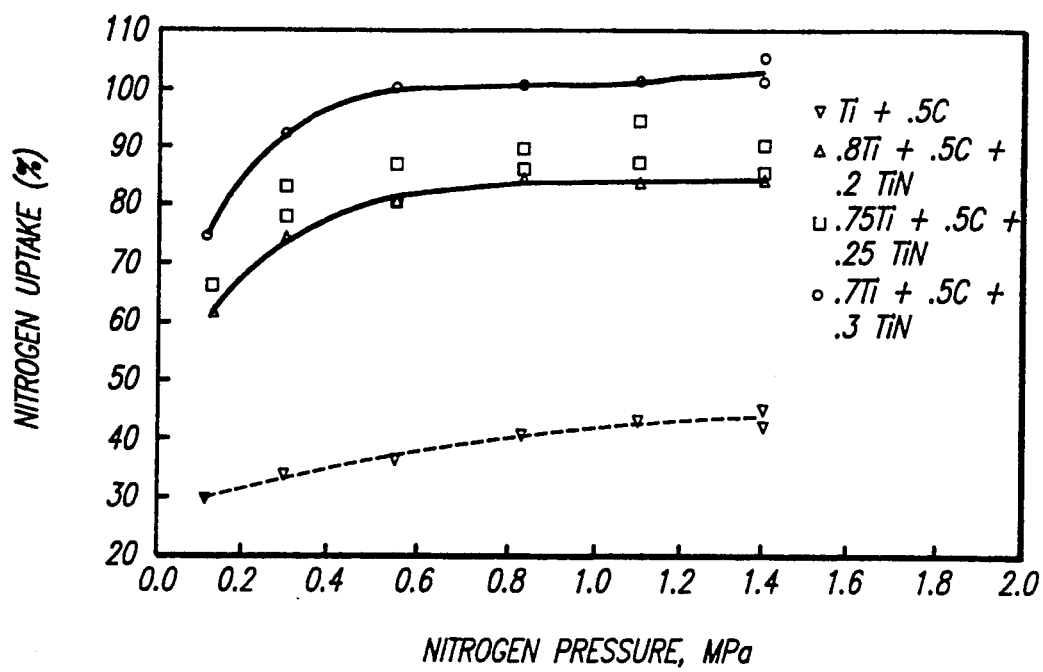
FIG. 1 illustrates the effect of nitrogen pressure on nitrogen uptake of diluted or undiluted Ti+0.5 C samples.

Pursuant to the present invention, the mechanism of the synthesis of transition metal carbonitrides (with particular emphasis on titanium carbonitride) from the reaction of transition metal and elemental carbon with nitrogen gas (0.1–1.4 MPa) and using TiN as a diluent has been examined. Single-phase materials have been prepared by reacting a mixture of carbon and transition metal (such as, for example, titanium) and optionally a diluent in a nitrogen atmosphere in a self-sustaining propagating combustion mode.

In view of its commercial importance, the present invention is of particular interest with respect to the preparation of titanium carbonitride. The basic methodology, however, may suitably be employed for the preparation of other transition metal carbonitrides. Several other transition metal carbonitrides heretofore prepared by other known methods may also be prepared by the method of the present invention. Examples include $ZrC_xN_y$, $HfC_xN_y$, $NbC_xN_y$, $TaC_xN_y$, etc. In addition, it is possible in accordance with the present invention to prepare mixed carbonitrides, such as $Zr_{1-x}Ti_xC_yN_z$.

Pursuant to the inventive method, metal powder of a suitable size (e.g., −325 mesh for titanium) is mixed with a carbon source (e.g., carbon black) in an appropriate overall atomic ratio for metal:carbon corresponding to that in the desired final product (e.g., 2:1 for Ti:C). The powder mixture is then suitably pressed using, e.g., a cold hydraulic press to form a green body (for example, in the form of a pellet). While the range of suitable densities for the green body may be readily determined empirically, a green density of about 50% to about 60%, more preferably on the order of about 55–60%, have been found suitable for, e.g., green bodies comprising titanium and carbon.

The green body is now ready to be treated in order to initiate the self-propagating high-temperature synthesis reaction, with a molecular nitrogen atmosphere as nitrogen source. The SHS process may suitably be effected inside a combustion chamber containing pure nitrogen. The reaction is initiated by imparting energy to one end of the sample; this is suitably carried out by, e.g., transferring sufficient energy to the sample in the form of heat radiated from a tungsten coil. Alternatively, the necessary energy for initiation of the reaction may be supplied by other means, such as a laser. The amount of energy necessary to initiate the SHS process in accordance with the present invention is readily determined empirically, and is substantially lower than the energy input required for synthesis of transition metal carbonitrides pursuant to the heretofore known methods.

After the green body has been ignited, a self-propagating reaction wave begins to move down the sample. Upon completing of the traversal of the wave in a relatively short period of time (as little as one minute), the compacted material has been converted to the desired carbonitride.

Reactions in a self-propagating mode present an attractive practical alternative to conventional methods of material preparation for a variety of reasons. The process is relatively simple and requires relatively low amounts of energy input. Moreover, the products have in general a higher degree of purity as prepared, relative to the heretofore known methods. In addition, in accordance with the inventive method it is possible to achieve simultaneous formation and densification of the desired materials.

From X-ray, electron microprobe, and thermogravimetric analyses, it has been concluded that the formation of the carbonitride is a two-step process. Using titanium as an example, the first step involves the formation of the nonstoichiometric carbide phase, $TiC_{0.5}$, which is followed by the uptake of nitrogen by this defect compound to form the solid solution $TiC_{0.5}N_{0.5}$. This is clearly demonstrated by the X-ray results shown in FIG. 10.

The two interstitial compounds of titanium, the carbide (TiC) and the nitride (TiN), have cubic NaCl type crystal structures and are completely soluble in each other. Both TiC and TiN phases exist over a wide range of stoichiometric ratios (with $x \approx 0.5-1$). As a solid solution, they form $TiC_xN_y$ where $x+y \approx 1$, with the same NaCl crystal structure.

In some cases, it is preferred to employ a diluent in addition to the transition metal and carbon source. For example, without the addition of a diluent, a titanium and carbon precursor is typically only partially converted to the carbonitride; in the examples reported herein, the average composition of the product prepared from undiluted samples was $TiC_{0.5}N_{0.2}$. Complete conversion, i.e., where the product is $TiC_{0.5}N_{0.5}$, is obtained with the addition of at least about 0.3 moles of TiN (i.e., with a reactant mixture of 0.7Ti+0.5C+0.3-TiN). Full conversion is obtained at $P_{N2} \geq 0.6$ MPa. The limitation on conversion for undiluted samples is believed to be the consequence of melting of the titanium. Thus, use of a diluent is not considered to be necessary with all transition metals (e.g., in preparation of tantalum carbonitrides).

The formation of titanium carbonitride in particular by SHS involves the reaction of titanium with both carbon and nitrogen in a single process step. The results obtained in this investigation, however, suggest a more complex reaction mechanism which involves sequential stages. In particular, the mechanism of synthesis of the carbonitride is believed to involve a two-stage process according to the following:

  (1)

  (2)

The first stage takes place in the combustion zone, while the second takes place after the passage of the wave. As indicated above, this is clearly demonstrated by the results of FIG. 10.

Figure 9:
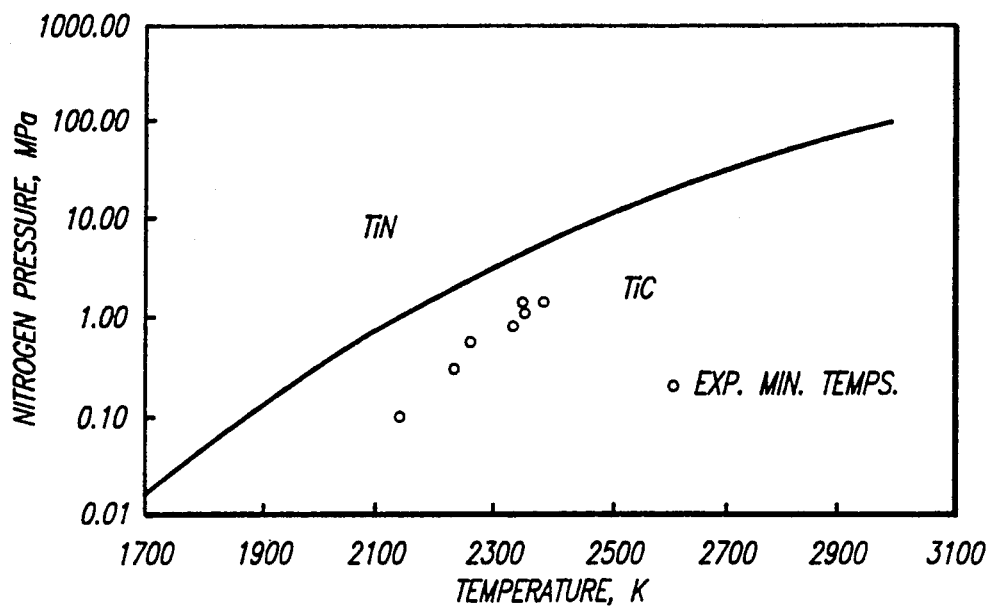
FIG. 9 illustrates the stability regions for TiN and TiC at different temperatures and pressures.

Thermodynamic calculations on the relative stability of TiC and TiN were made as a function of temperature and nitrogen pressure. The basis of these calculations was the following:

  (3)

and the results are depicted in FIG. 9 where the solid curve represents the boundary between the stability regions of these two ceramics. For example, at 1 atm $P_{N2}$ (~0.1 MPa) the carbide phase is stable above about 1700° C. Experimental results of temperature and pressure under which a self-propagating reaction can be sustained are plotted on FIG. 9. Since for any given nitrogen pressure a decrease in temperature favors the formation of TiN, only the lowest combustion temperatures observed for any given $P_{N2}$ (see FIG. 2) are plotted. In all cases under the prevailing experimental conditions, the points lie inside the TiC phase stability region, suggesting that under equilibrium conditions the formation of the carbide phase is thermodynamically favored.

The invention may be better understood with reference to the accompanying examples, which should be viewed as illustrative only and should not be construed as in any sense limiting the scope of the invention as defined in the claims appended hereto.

EXAMPLES

The reagents used were powders of titanium, titanium nitride, carbon, and nitrogen gas. The titanium and titanium nitride powders (−325 mesh) were supplied by Alfa Products (Danvers, Mass.) as 99% pure. The chemical impurities (in wt %) present in the titanium powder were C (0.07), H (0.2), O (0.21), and Ca (0.01). X-ray diffraction analysis of Ti and TiN powders revealed trace amounts of TiC in the Ti powder and approximately 5 wt % $Ti_2N$ in the TiN powder. The amorphous carbon black used for synthesis of $TiC_xN_y$ was Regal 250 available from the Cabot Corporation (Waltham, Mass.); the specific surface area of the carbon black powder was 50 $m^2/g$, its mean particle size was 35 nm, and its volatile content was 1%. The nitrogen gas was supplied by Liquid Carbonic (Oakland, Calif.) and had a purity of 99.997% with oxygen and water content of <5 ppm and <3 ppm, respectively. The mixing of titanium and carbon black powders was achieved by dry ball milling for 18 h. The weight of each batch was 120 g for the stoichiometric ratio of Ti+0.5 C and 40 g for the Ti+0.1 C to Ti+0.9 C samples. The diluted samples were mixed with 0.2, 0.25, and 0.3 mol of TiN/mol of the reactants.

Cylindrical compacts were formed in a stainless steel die 19 mm in diameter. They were pressed uniaxially at about 30 MPa to a height of about 25 mm. The relative density of the compacts was kept within the range of 58±2.5% of the theoretical value.

The samples were reacted in a stainless steel combustion chamber (190 mm height, 220 mm internal diameter) equipped with a mechanical pump for evacuation of air and nitrogen inlet and outlet means to maintain constant nitrogen flow at a pressure of about one atmosphere. With the outlet valve closed, the pressure at room temperature could be increased to 1.4 MPa (about 15 atm or 225 psi). The combustion reaction was initiated by radiation heat from a tungsten coil which was placed approximately 2 mm above the top surface of the cylindrical specimen. The ignition current was controlled by a variable stepdown transformer. The chamber had two quartz windows on opposite sides which facilitated the simultaneous measurement of the combustion temperature (with a two-color pyrometer) and the recording of the combustion process with a SLO-420, Sony, Japan video camera (equipped with a time-code generator). The Type R99CIS, Ircon two-color pyrometer (Niles, Ill.) used in this study had a temperature range of 1000°-3500° C. Its sensing head was placed about 35 cm away from the specimen surface; the diameter of the measured spot on the surface of the sample was approximately 2 mm. The chemical analysis of the reacted samples was performed with an X-ray powder diffractometer.

EXAMPLE 1

The effect of nitrogen gas pressure on the degree of nitrogen uptake (degree of conversion) of diluted and undiluted Ti+0.5 C samples is shown in FIG. 1. The diluent was TiN and the extent of dilution was 0.2, 0.25, and 0.3 on a molar basis. The percent nitrogen uptake was calculated based on the weight change after combustion and the assumption that nitrogen reacts with the available titanium. The available titanium is defined as the amount of titanium in the reactant compact available to form the stoichiometric product ($TiC_{0.5}N_{0.5}$).

The nitrogen uptake of the undiluted samples in FIG. 1 is far less than the stoichiometric value.

Addition of diluent (TiN) to the reactants leads to an increase in nitrogen uptake. With 0.3 mol TiN/mol reactant, nitrogen uptake is about 100% even at 0.6 Mpa of nitrogen.

X-ray diffraction analysis of the reacted Ti+0.5 C specimens revealed that the entire sample, regardless of dilution or nitrogen pressure, was a single cubic phase. This cubic phase has the same (NaCl type) crystal structure as TiC and TiN with lattice parameters of 0.4277–0.4307 nm.

Figure 2:
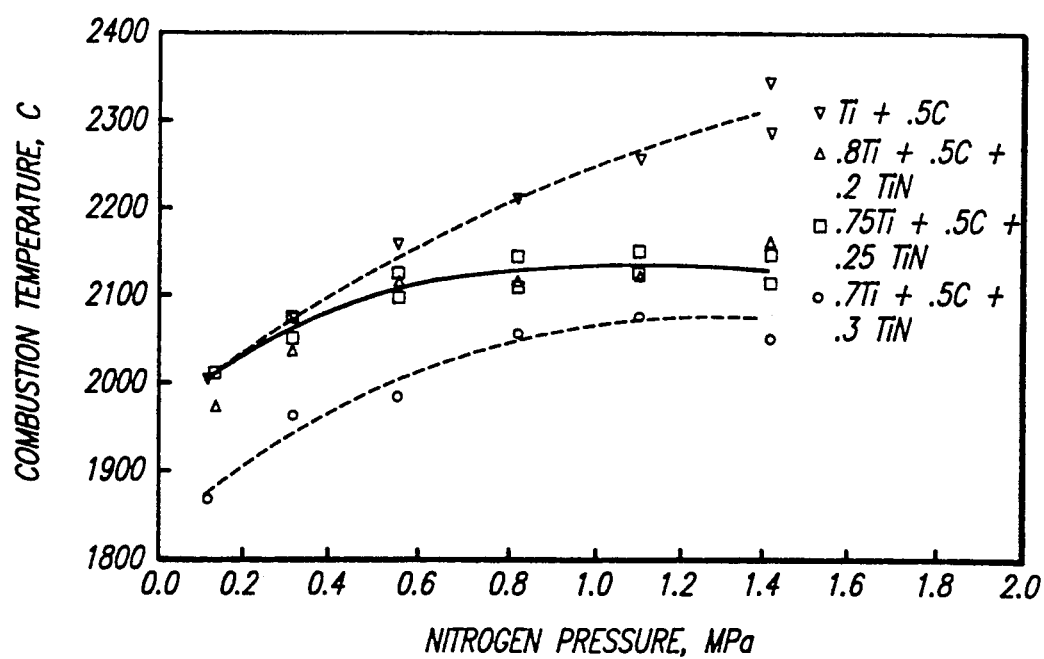
FIG. 2 illustrates the effect of nitrogen pressure on combustion temperature of diluted or undiluted Ti+0.5 C samples.
Figure 3:
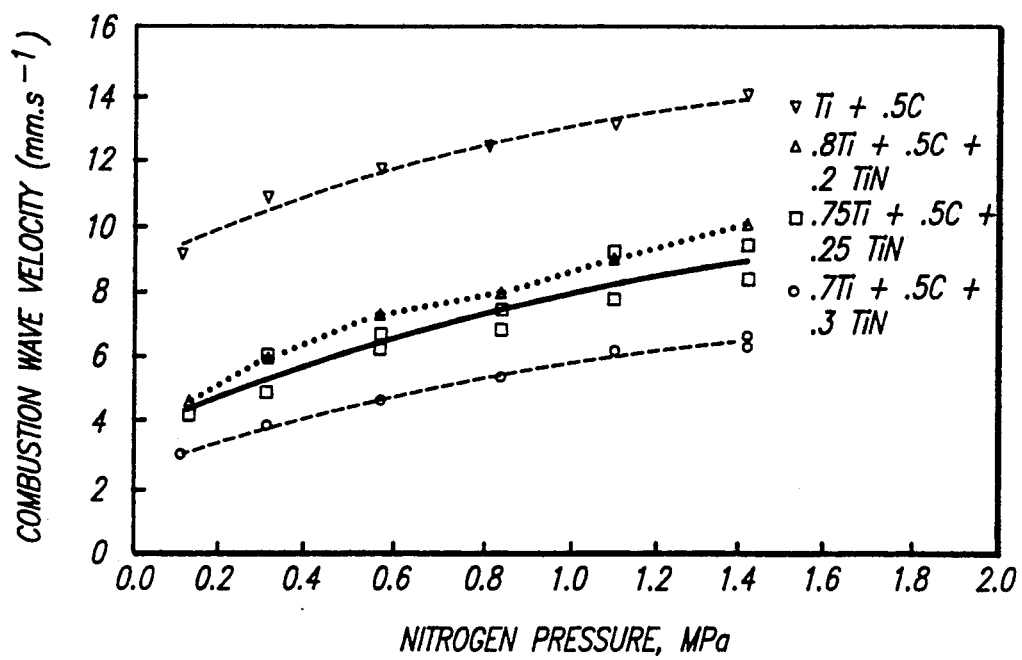
FIG. 3 illustrates the effect of nitrogen pressure on the combustion wave velocity for diluted and undiluted Ti +0.5 C samples.

FIG. 2 shows the dependence of the combustion temperature of the Ti+0.5 C samples on the pressure of nitrogen gas. Expectedly, the undiluted samples have a higher reaction temperature which is elevated by the increase of nitrogen pressure. The corresponding variation of combustion wave velocities with nitrogen pressure is shown in FIG. 3. Analogous to the behavior of temperature, the combustion wave velocity is increased by increasing the nitrogen pressure.

EXAMPLE 2

Figure 4:
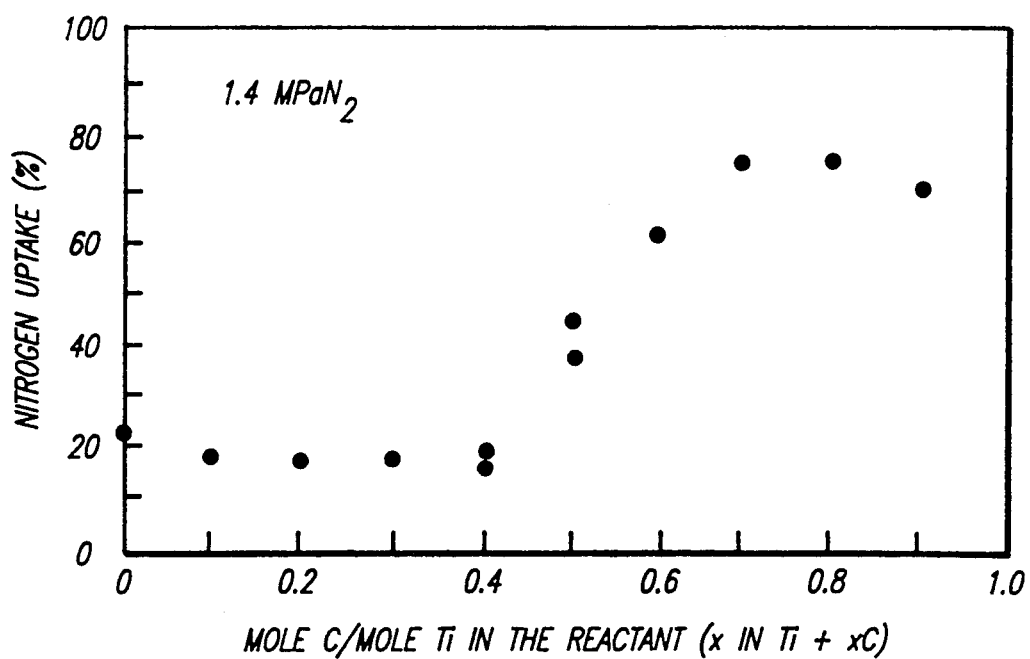
FIG. 4 illustrates the effect of carbon contents of titanium samples on the nitrogen uptake.
Figure 5:
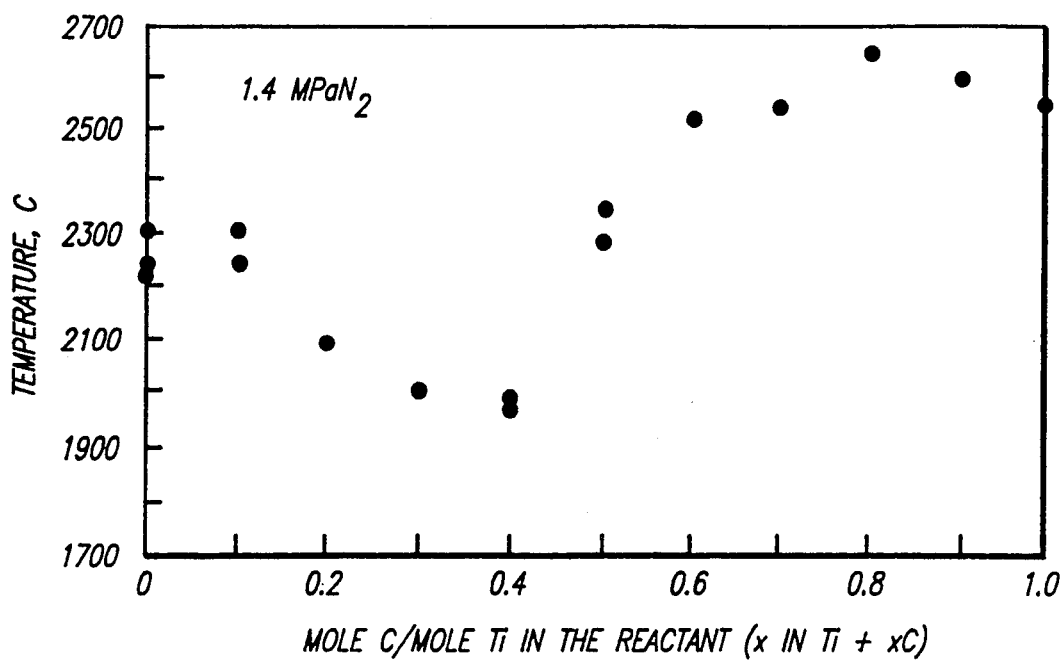
FIG. 5 illustrates the effect of carbon contents of titanium samples on the combustion temperature.
Figure 6:
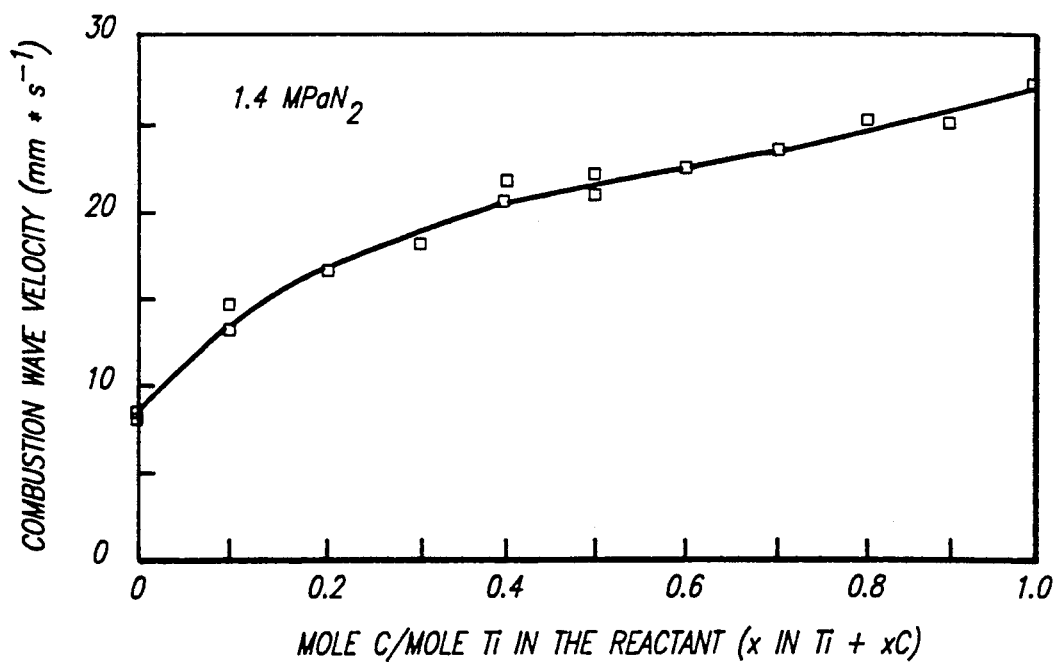
FIG. 6 illustrates the effect of carbon contents of titanium samples on the combustion wave velocity.

The effect of carbon content on the combustion synthesis of titanium carbonitride was investigated at 1.4 MPa of nitrogen gas. The dependence of nitrogen uptake on the carbon content of the reacting specimens is shown in FIG. 4. The results show that for carbon content less than 0.4 C, the nitrogen uptake is relatively constant and is at a low value (~20%). With higher carbon content, the nitrogen uptake increases reaching a value of approximately 80% at x of 0.7 (where x is defined by Ti+xC). FIG. 5 shows the variation of the combustion temperature with carbon content (x). The combustion temperature initially decreases as carbon content increases up to x=0.4; however, as the carbon content increases beyond this value, the temperature increases to higher than 2600° C. In contrast, FIG. 6 shows that the combustion wave velocity increases smoothly with an increase in the carbon content of the sample.

EXAMPLE 3

Figure 7:
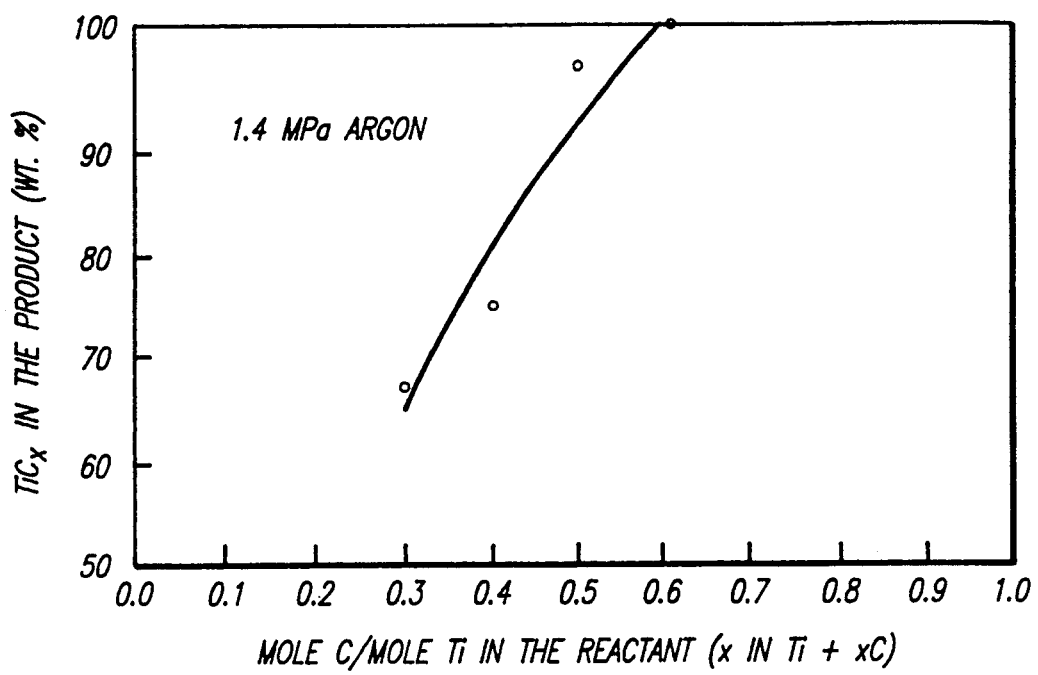
FIG. 7 illustrates the effect of carbon content of titanium samples on the percent titanium carbide in the product.
Figure 8:
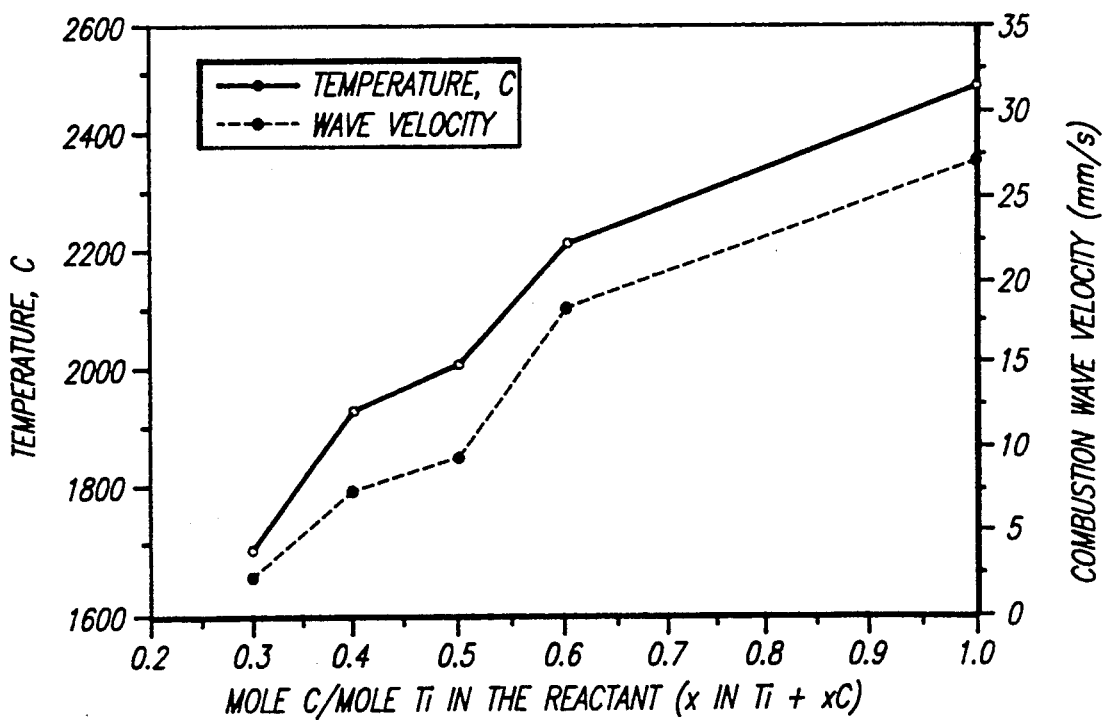
FIG. 8 illustrates the effect of carbon content of titanium samples of the combustion temperature and combustion wave velocity.

To further investigate the effect of carbon content on the combustion behavior of titanium carbon mixtures and to confirm that the formation of titanium carbonitride occurs in a two-stage reaction, another series of experiments was performed in 1.4 MPa of argon gas. The initial composition of these samples was from 0.3–1 mol C/mol Ti. FIG. 7 presents the variation of the amount of titanium carbide in the combustion products with the amount of carbon in the reactant mixture. The amount of titanium carbide was obtained from a quantitative X-ray diffraction analysis. The rather high percentage of titanium carbide in the combustion products of the samples containing less than 0.6 C and the existence of a single carbide phase for compositions between x=0.6 and x=1.0 are indications of the formation of non-stoichiometric TiC. The lattice parameters ($2 \times d_{200}$=0.4307–0.4338 nm) of the resulting carbides are smaller than the reported lattice parameter of the stoichiometric TiC ($2 \times d_{200}$=0.4358 nm), which is consistent with the conclusion that a non-stoichiometric TiC forms even for x=0.3. The effect of the carbon content on the temperature and velocity of the combustion wave for Ti+xC combusted in argon is shown in FIG. 8.

Examination of FIGS. 4 and 5 reveals an interesting trend. The nitrogen uptake for samples Ti+xC remains basically constant for x from zero to 0.4, but increases markedly between about x=0.4 and x=0.7. Comparison of these results with those obtained with Ti+xC mixtures combusted in argon (FIG. 7) shows that no self-sustaining reaction between carbon and titanium is possible unless x~0.3 or higher. Between x~0.3 and x~0.6 a significant increase in the conversion to TiC takes place. This region of carbon content coincides reasonably well with that over which the marked increase in nitrogen uptake is observed (FIG. 4). These results suggest that in the synthesis of the carbonitride (i.e., with Ti+0.5 C as reactants), the formation of a nonstoichiometric carbide phase is the first step in the synthesis of the solid solution. When equiatomic mixtures of Ti+C were ignited in a 1.4 MPa atmosphere of $N_2$ (g), the samples did not experience weight gain, as would be expected for nitrogen uptake. Furthermore, X-ray analysis on the product showed it to be TiC only.

EXAMPLE 4

Figure 10:
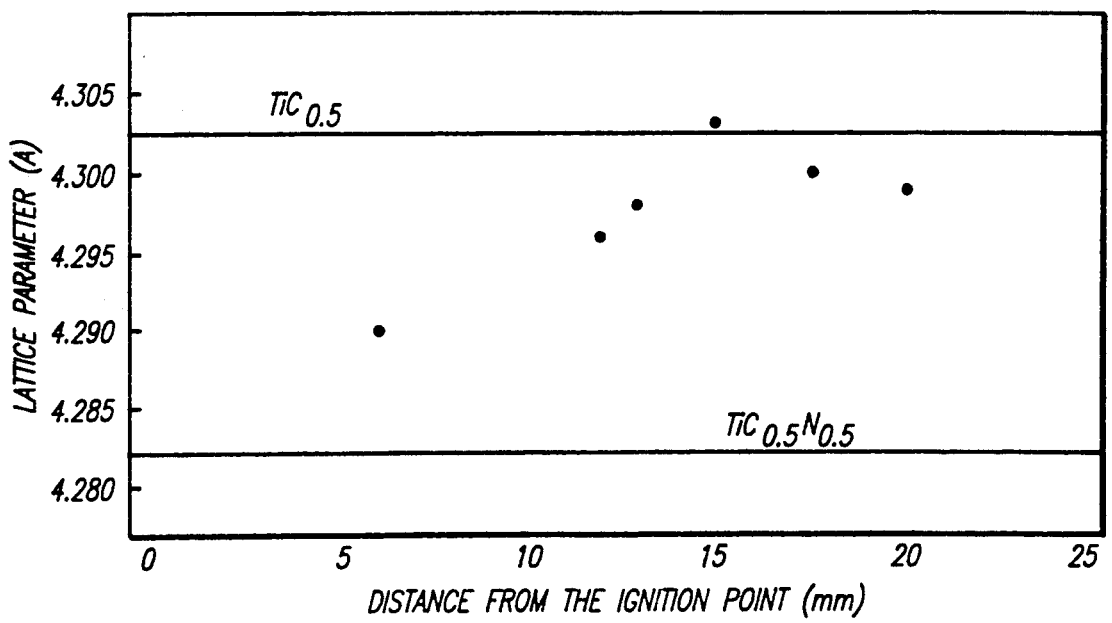
FIG. 10 illustrates the lattice parameter of a reacting quenched sample as a function of distance from the ignition point.

As self-sustaining reactions may not represent equilibrium conditions, another set of experiments was conducted to verify the nature of the mechanism in the formation of the carbonitride. Samples of Ti+0.5 C were ignited in 1 atm $N_2$ and allowed to react partially before being quenched into liquid argon. Electron microprobe analysis on the surface of these samples showed the presence of the carbonitride phase only; however, when these quenched samples were sectioned and analyzed along the axial (center) direction, the results showed a dependence on the distance along the sample. X-ray analysis was made on samples taken at measured intervals from the top of the sample (i.e., from the end at which the combustion process was initiated). The results are shown in FIG. 10. The lattice parameter near the top of the sample corresponds to that of the carbonitride ($TiC_{0.5}N_{0.5}$), and as the distance increases from that end, the parameter increases towards the value corresponding to $TiC_{0.5}$. The analysis was carried out to the quenched combustion front (at~20 mm in FIG. 10).

From the results of FIG. 10 and the measured wave velocity of 9 mm·s$^{-1}$ (see FIG. 3), the second step is complete within about 1.7 seconds after the passage of the wave, and appears to take place within a duration of one second (see FIG. 10).

The above mechanism pertains to reactant mixtures with x=0.5 (i.e., Ti+0.5 C). For values of x≲0.3, no self-sustaining combustion can be initiated in mixtures of titanium and carbon in an argon atmosphere (FIG. 7); however, such mixtures can sustain a combustion wave when ignited in nitrogen at 1.4 MPa. This leads to the conclusion that for such compositions the reaction between titanium and nitrogen plays a dominant role. The combustion temperature for such samples (FIG. 5) decreased with an increase in carbon content. Such behavior is consistent with the role of carbon as a diluent and not a reactant; in particular, as no self-propagating reaction was observed for the compositions comprising <0.3 C/mole titanium in argon atmosphere, in this range of composition the reaction in nitrogen is initiated by nitrogen first, rather than by the carbide as in the two-stage reaction hereinbefore described. The temperature increases only when x≳0.5. Under these conditions the carbon reacts with titanium to form the nonstoichiometric $TiC_{0.5}$ which enhances the uptake of nitrogen.

While there have been shown and described the fundamental novel features of the invention with reference to particular illustrative embodiments thereof, it will be understood that various omissions, substitutions and changes in the form and details of the illustrated methods may be made by those skilled in the art without departing from the spirit of the invention. It is the intention, therefore, to be limited only as indicated by the scope of the following claims.

What is claimed is:

1. A method for preparing a single-phase transition metal carbonitride, comprising:

forming a mixture of at least one transition metal powder and a transition metal nitride as an additional source of transition metal with elemental carbon in an atomic ratio of metal:carbon corresponding to that in said transition metal carbonitride;

pressing the powder mixture to form a compressed green body; and initiating a self-propagating wave reaction in said green body by imparting energy to said green body at an end thereof under an atmosphere of essentially pure nitrogen at a pressure in the range of about 0.1 to about 1.4 Mpa.

2. A method according to claim 1, wherein said transition metal is selected from the group consisting of titanium, zirconium, hafnium, niobium and tantalum.

3. A method according to claim 2, wherein said transition metal is titanium.

4. A method according to claim 1, wherein said nitride is present in an amount comprising at least about 30% of the total transition metal in said green body.

5. A method according to claim 1, wherein said nitrogen atmosphere is at a pressure of at least 0.6 MPa.

6. A method according to claim 1, wherein said compressed green body has a density of about 50–60% of its theoretical full density.

* * * * *